(12) United States Patent
Morley

(10) Patent No.: US 9,113,061 B1
(45) Date of Patent: Aug. 18, 2015

(54) SYSTEM AND METHOD FOR ZOOM ALIGNMENT OF CLIP-ON DIGITAL ELECTRO-OPTIC SIGHT

(71) Applicant: NIVISYS, LLC, Tempe, AZ (US)

(72) Inventor: Roland Morley, Phoenix, AZ (US)

(73) Assignee: NIVISYS, LLC, Tempe, AZ (US)

( * ) Notice: Subject to any disclaimer, the term of this patent is extended or adjusted under 35 U.S.C. 154(b) by 52 days.

(21) Appl. No.: 13/666,882

(22) Filed: Nov. 1, 2012

Related U.S. Application Data

(63) Continuation-in-part of application No. 12/545,777, filed on Aug. 21, 2009, now abandoned.

(60) Provisional application No. 61/640,604, filed on Apr. 30, 2012.

(51) Int. Cl.
   *F41G 1/38* (2006.01)
   *H04N 5/225* (2006.01)

(52) U.S. Cl.
   CPC .................. *H04N 5/2254* (2013.01)

(58) Field of Classification Search
   CPC ............ F41G 1/38; F41G 1/473; F41G 1/30; F41G 1/345; F41G 1/387; F41G 3/06; F41G 3/08; G02B 23/14; G02B 23/145; G02B 27/32; G02B 27/34; G02B 27/36; H04N 5/2254
   USPC .............................. 42/122; 356/247, 251, 252
   See application file for complete search history.

(56) References Cited

U.S. PATENT DOCUMENTS

| | | | |
|---|---|---|---|
| 5,026,158 A * | 6/1991 | Golubic | 356/252 |
| 5,200,827 A | 4/1993 | Hanson et al. | |
| 5,347,910 A | 9/1994 | Avila et al. | |
| 5,388,005 A | 2/1995 | Wilson | |
| 5,410,815 A | 5/1995 | Parikh et al. | |
| 5,824,942 A | 10/1998 | Mladjan et al. | |
| 5,884,198 A | 3/1999 | Kese et al. | |

(Continued)

FOREIGN PATENT DOCUMENTS

| | | |
|---|---|---|
| EP | 1615065 | 1/2006 |
| WO | WO9429664 | 12/1994 |
| WO | WO02103406 | 12/2002 |

OTHER PUBLICATIONS

"The Latest Thermal Imaging System for Process Monitoring and Plant Surveillance," available at http://www.landinstruments.net/products/thermal_imaging/fiti6.htm, 2006, p. 1-3; Land Instruments International.

(Continued)

*Primary Examiner* — Samir Abdosh
(74) *Attorney, Agent, or Firm* — Booth Udall Fuller, PLC

(57) ABSTRACT

A clip-on sight that includes a sight housing, a lens, a sensor, a display, a module, and a plurality of buttons positioned on the sight housing is disclosed. The module is designed to display an alignment reticle on the display and move the alignment reticle to an electronic zoom center point in response to the buttons. The electronic zoom center point is stored in memory and serves as the center point when the clip-on sight is zoomed in from an un-zoomed (1.0×) zoom to a 2.0× zoom. A method of aligning a clip-on sight is also disclosed. To align the clip-on sight, a user activates the user menu, activates an alignment reticle on the display of the clip-on sight, sets the electronic zoom center point by moving the alignment reticle to the electronic zoom center point.

5 Claims, 13 Drawing Sheets

(56) References Cited

U.S. PATENT DOCUMENTS

| | | |
|---|---|---|
| 5,930,934 A | 8/1999 | Fisher et al. |
| 5,949,015 A | 9/1999 | Smith et al. |
| 6,057,548 A | 5/2000 | Schatzberg |
| 6,366,212 B1 | 4/2002 | Lemp |
| 6,449,892 B1 | 9/2002 | Jenkins |
| 7,246,461 B2 | 7/2007 | Wooden |
| 7,329,127 B2 | 2/2008 | Kendir et al. |
| 8,464,451 B2 * | 6/2013 | McRae .......... 42/1.01 |
| 2002/0163486 A1 | 11/2002 | Ronzani et al. |
| 2006/0048427 A1 | 3/2006 | Crandall et al. |
| 2008/0064500 A1 | 3/2008 | Satsukawa et al. |
| 2009/0091634 A1 | 4/2009 | Kennedy et al. |
| 2009/0111454 A1 | 4/2009 | Jancic et al. |
| 2012/0090216 A1 * | 4/2012 | Li .......... 42/122 |

OTHER PUBLICATIONS

"FLIR Systems Accessories," available at http://www.flirthermography.com/accessories/accessory.asp?accessory_id=1233, 2005, p. 1-2, FLIR Systems, Inc.

"IR747 Pro Infrared FLIR Camera System," available at http://www.imaging1.com/thermosight.html, p. 1-14, Sierra Pacific Innovations.

* cited by examiner

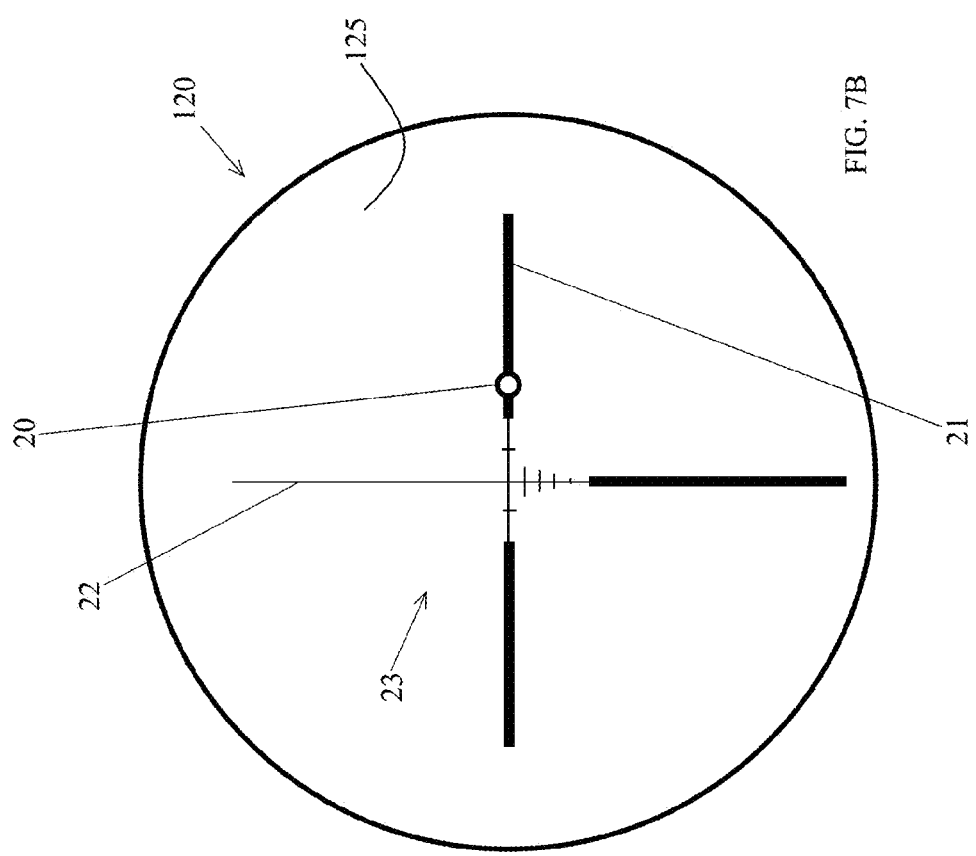

SYSTEM AND METHOD FOR ZOOM ALIGNMENT OF CLIP-ON DIGITAL ELECTRO-OPTIC SIGHT

CROSS REFERENCE TO RELATED APPLICATIONS

This document claims the benefit of the filing date of U.S. Provisional Patent Application 61/640,604, entitled "Method for Zoom Alignment of Clip-On Digital Electro-Optic Sight" to Morley which was filed on Apr. 30, 2012, the disclosure of which is hereby incorporated by reference.

This document is also a continuation in part application of the earlier U.S. patent application Ser. No. 12/545,777, entitled "Remote Control for a Thermal Imaging Device" to Harding which was filed on Aug. 21, 2009, the disclosure of which is hereby incorporated by reference.

BACKGROUND

1. Technical Field

Aspects of this document relate generally to an apparatus and method for zoom alignment of clip-on electro-optic sights.

2. Background Art

Current clip-on sights are designed and manufactured as an un-zoomed (1.0x) or zoomed-out optical magnification sight. The un-zoomed optical magnification sight provides the necessary light amplification or thermal imagery and may be placed in front of a bore-sighted day optic without introducing any bore-sight shift to the combined optical system. Current clip-on sight must have the following two optical properties well established. First, the optical magnification must be very close to 1.0x. Usually the design nominal value is 1.0 with an allowable tolerance of 3%, so that magnification values ranging from a low of 0.97 to a high value of 1.03 will result in systems with acceptable performance. And second, the input optical axis and the output optical axis of the sight must be aligned. The angular tolerance for this determines the ultimate accuracy of the clip-on sight. Usually an alignment tolerance of within 1.0 minutes of arc is required to provide the accuracy for aimed weapons firing.

When these two values are achieved at the factory, a fielded clip-on sight provides a very simple and reliable device for the user. The clip-on sight is installed in front of the day optic and switched ON. The user looks through the day optic and sees an enhanced (intensified or thermal as the case may be) image of the scene, with the same aiming reticle superimposed that he is used to using with the day optic in normal day time operations.

FIGS. 1A and 1B illustrate a comparison of an object as viewed through only a day sight (FIG. 1A) and through a combined day sight and un-zoomed (1.0x) clip-on sight (FIG. 1B). As shown, a properly designed, manufactured 1.0x clip-on sight provides the essential low light imagery with no change of boresight alignment.

Small mechanical misalignments between the optical axis of the day sight and the clip-on sight will always exist. This misalignment is due to any combination of the following factors: day sight optical axis to weapon bore; weapon bore to mounting rail; and/or rail (weapon mount) mechanical axis clip-on sight optical axis. These factors can result in a small misalignment between the day sight and the clip on sight that do not cause an image shift, because of the inherent accuracy (magnification and alignment) built in to the clip-on sight, but result in the day sight looking at slightly different parts of the display. That is, the center pixel of the display is not necessarily going to be coincident with the day sight cross-hair. This will cause an aiming error when the zoom operation is performed.

Thus, in practice this means that the day sight reticle cross-hair is not pointing directly at the center pixel of the electronic display. When the zoom operation is performed, the displayed image is magnified, with only the image displayed on the center pixel remaining invariant. The further the day sight reticle is from the center display pixel, the greater the error in image displacement when the image is zoomed. Therefore, as depicted in FIGS. 2A and 2B, mechanical misalignment can cause boresight shift when the sight is used in the 2.0x zoomed mode. As shown, in the un-zoomed (1.0x) mode shown in FIG. 2A, the cross hairs of the reticle are over the bottom left of the truck windshield. In the 2.0x zoomed mode shown in FIG. 2B, the cross-hairs of the reticle are over the center of the passenger door of the truck, rather than the bottom left of the truck windshield. Such misalignment is problematic to user of the weapon.

Accordingly, existing sights rely on factory alignment tolerances to determine the overall accuracy of the system. Even more, some systems warn the user that the zoomed image will result in aiming errors, that it is for target observation tasks only, and/or that the aiming/firing should be performed in the un-zoomed (1.0x) mode only.

SUMMARY

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

In one aspect, a clip-on sight is disclosed that includes: a sight housing; a lens positioned proximate a first end of the housing; a sensor positioned proximate the lens; a display positioned proximate a second end of the housing opposite the first end of the housing; at least one menu button; at least one adjustment button; a mounting unit; and at least one module positioned within the housing. The at least one module is configured to: display an alignment reticle on the display responsive to the at least one menu button; move the alignment reticle on the display to an electronic zoom center point responsive to the at least one adjustment button; store the electronic zoom center point in memory; transmit an un-zoomed image from the sensor to the display; and transmit a zoomed-in image from the sensor to the display, the zoomed-in image centered on the electronic zoom center point.

Particular implementations may include any or all of the following.

The at least one adjustment button may include two adjustment buttons and the at least one module may be configured to move the alignment reticle to the electronic zoom center point responsive to the two adjustment buttons.

The at least one module may be configured to move the alignment reticle vertically on the display responsive to the two adjustment buttons when the at least one module is in an elevation adjustment mode, and move the alignment reticle horizontally on the display responsive to the two adjustment buttons when the at least one module is an azimuth adjustment mode.

The alignment reticle may include one of a dot and a cross-hair.

The sensor may include a microbolometer.

The at least one adjustment button and the at least one menu button may be one of positioned on the sight housing and positioned on a remote control system.

In another aspect, a clip-on sight zoom alignment system is disclosed that includes: a gun assembly comprising a butt end, a bore end, and a rail mount that extends at least partially between the butt end and the bore end; a day sight coupled to the rail mount and comprising a viewing end, a capturing end opposite the viewing end, and a reticle visible through the viewing end; a clip-on electronic sight coupled to the rail mount between the day sight and the bore end of the gun, the clip-on electronic sight comprising a sight housing, a lens positioned proximate a first end of the housing, a sensor positioned proximate the lens, at least one menu button, at least one adjustment button, and a display positioned proximate a second end of the housing opposite the first end of the housing and configured to display an image captured by the sensor in an un-zoomed view and a zoomed-in view; and an alignment reticle displayable on the display responsive to the at least one menu button and movable on the display responsive to the at least one adjustment button to set an electronic zoom center point, the electronic zoom center point aligned with a center of the day sight reticle when viewed through the viewing end of the day sight such that the zoomed-in view is centered on the electronic zoom center point.

Particular implementations may include any or all of the following.

The at least one adjustment button may include two adjustment buttons and the at least one module may be configured to move the alignment reticle to the electronic zoom center point responsive to the two adjustment buttons.

The at least one module may be configured to move the alignment reticle vertically on the display responsive to the two adjustment buttons when the at least one module is in an elevation adjustment mode, and move the alignment reticle horizontally on the display responsive to the two adjustment buttons when the at least one module is an azimuth adjustment mode.

The alignment reticle may include one of a dot and a cross-hair.

The sensor may include a microbolometer.

The at least one adjustment button and the at least one menu button may be one of positioned on the sight housing and positioned on a remote control system.

In still another aspect, a zoom alignment method for an electronic clip-on sight is disclosed that includes: activating, with at least one menu button on the clip-on sight, an alignment reticle on a display of the electronic clip-on sight; and setting an electronic zoom center point by moving, with at least one adjustment button on the clip-on sight, the alignment reticle on the display to align with a center of a sight reticle viewable through a day sight coupled to a weapon such that a zoomed-in image displayed on the display is centered on the electronic zoom center point.

Particular implementations may include any or all of the following.

The zoom alignment method may further include storing a location of the electronic zoom center point in memory of a module of the electronic clip-on sight.

The zoom alignment method may further include using the electronic zoom center point to calculate required zoomed image displacements when the zoomed-in image is displayed.

The zoom alignment method may further include mounting the electronic clip-on sight to the weapon between the day sight and a bore end of the weapon.

The at least one adjustment button may include two adjustment buttons.

Setting the electronic zoom point by moving the alignment reticle may include: activating, with the at least one menu button, an elevation adjustment mode; moving the alignment reticle vertically with the at least one adjustment button until the alignment reticle overlaps a vertical alignment of the sight reticle; activating, with the at least one menu button, an azimuth adjustment mode; and moving the alignment reticle horizontally with at least one adjustment button until the alignment reticle overlaps a horizontal alignment of the sight reticle.

The zoom alignment method may further include activating a user menu with the at least one menu button and exiting the user menu with the at least one menu button.

The zoom alignment method may further include turning off the alignment reticle with the at least one menu button.

The zoom alignment method may further include selecting one of a dot alignment reticle and a cross-hair alignment reticle.

The zoom alignment method may further include aligning an optical sight axis of the day sight with a weapon bore axis of the weapon.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended DRAWINGS (which are not necessarily to scale), where like designations denote like elements.

FIG. 7B is an exemplary view through a day sight of a second step in alignment of a clip-on sight;

DESCRIPTION

This disclosure, its aspects and implementations, are not limited to the specific components or assembly procedures disclosed herein. Many additional components and assembly procedures known in the art consistent with the intended zoom of alignment of an electronic clip-on and/or assembly procedures for a clip-on sight will become apparent for use with implementations of clip-on sights from this disclosure. Accordingly, for example, although particular housings, displays, lenses, sensors, and buttons are disclosed, such elements and implementing components may comprise any shape, size, style, type, model, version, measurement, concentration, material, quantity, and/or the like as is known in the art for such zoom of alignment of an electronic clip-on and implementing components, consistent with the intended operation of a zoom of alignment of an electronic clip-on.

Various embodiments of a clip-on sight 100 are disclosed herein. Although referred to throughout this document as a clip-on sight, various embodiments of the clip-on sight 100 may comprise a thermal clip-on sight, an electro-optic clip-on sight, a clip-on night vision sight, or any combination or derivation thereof that will become evident by the disclosures made herein. For example, sight 100 may comprise a thermal MWIR or SWIR sight. Furthermore, although reference is made to the clip-on sight 100 coupled or otherwise mounted to a weapon 150, such as the gun shown in FIG. 10, other weapons and uses are likewise contemplated.

Figure 9:
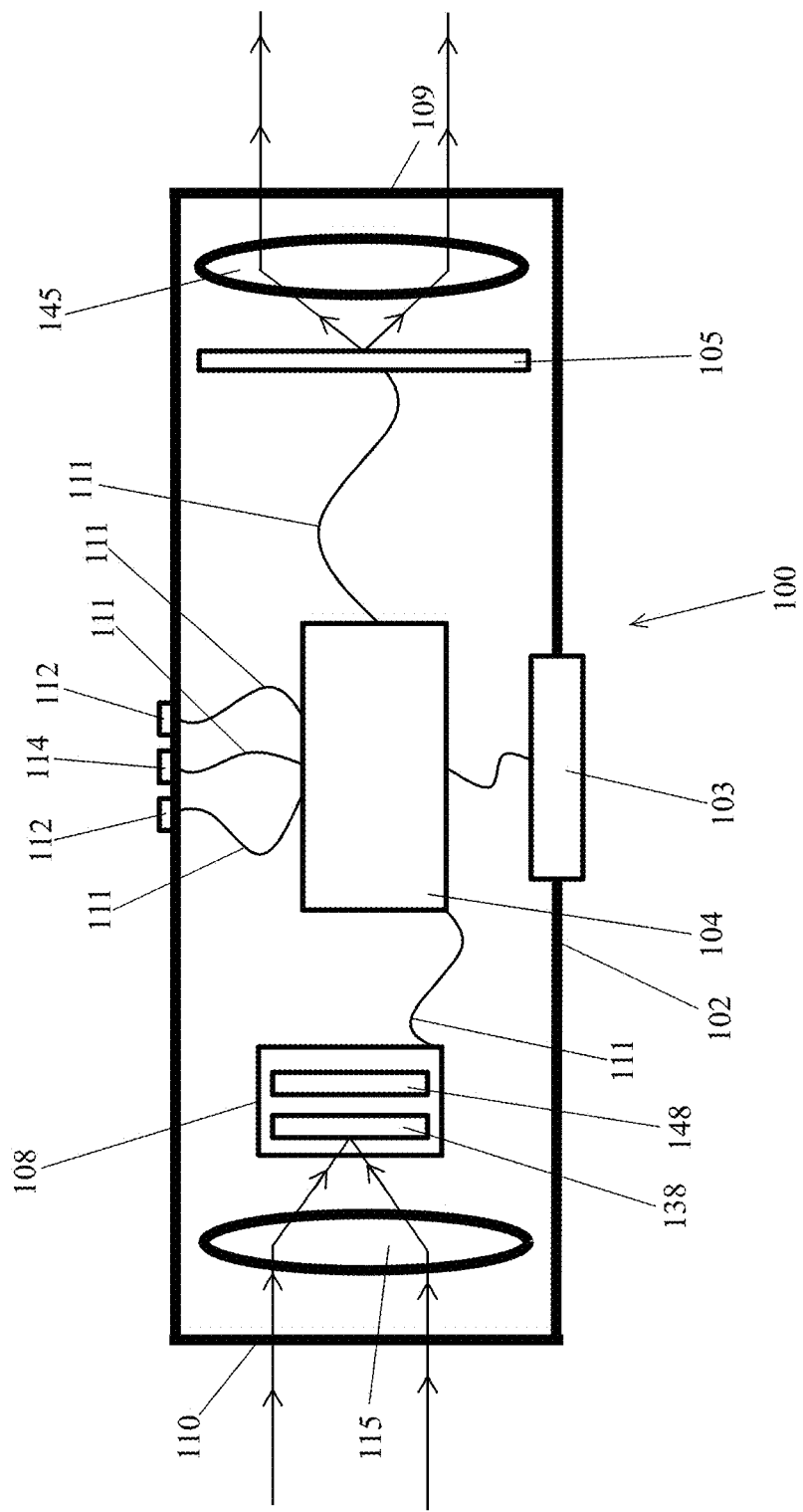
FIG. 9 is an exemplary block diagram of a clip-on sight.
Figure 10:
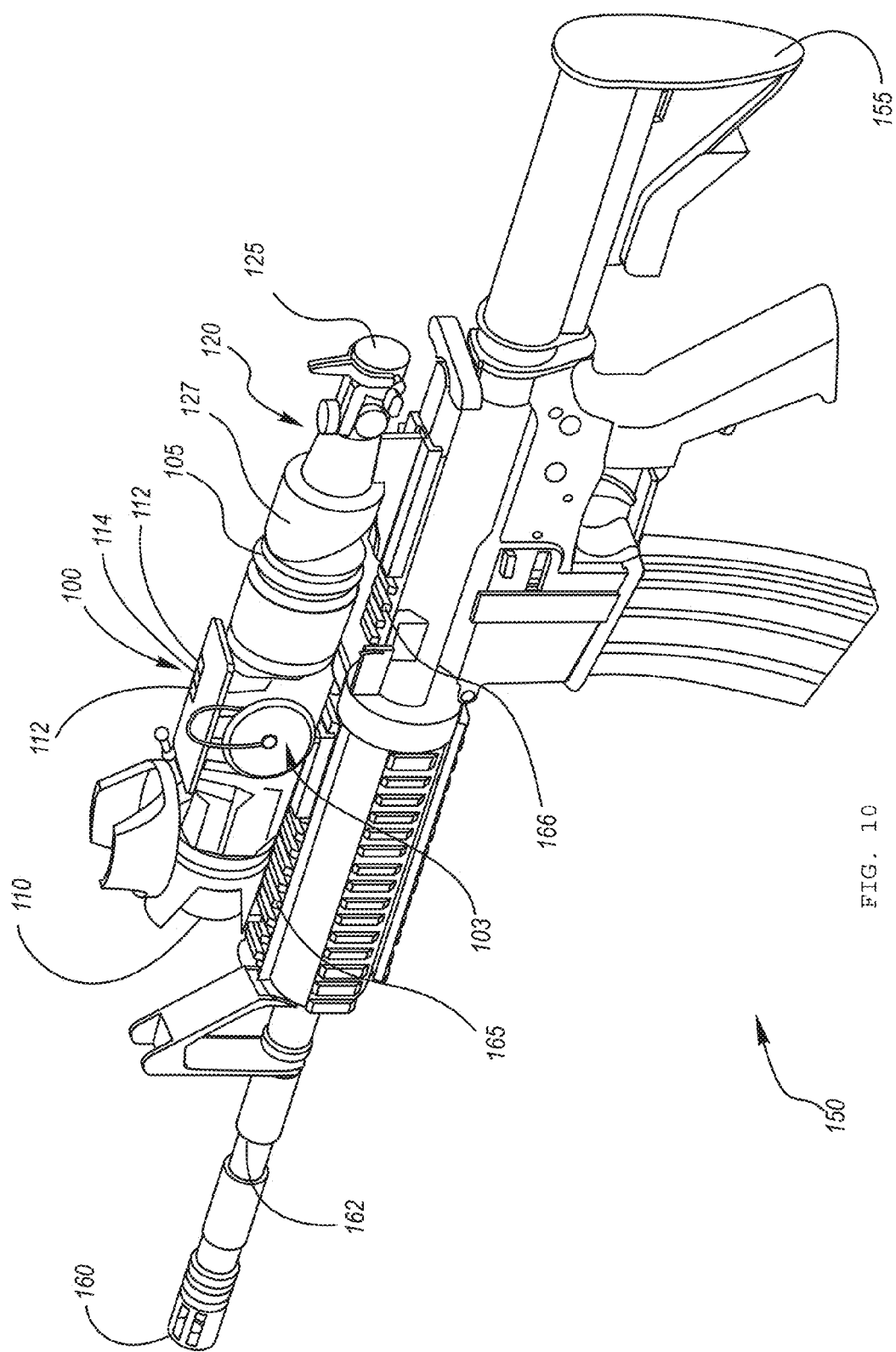
FIG. 10 is a perspective view of a clip-on sight mounted to a weapon.

As shown in FIGS. 9 and 10, clip-on sight 100 may comprise a sight housing 102 that houses at least one module 104. Sight housing 102 may comprise any material known in the art, such as but not limited to plastics, metals, rubbers, and the like, or any combination thereof.

Moreover, although only a single module 104 is shown in the exemplary block diagram of FIG. 9, module 104 may comprise any number of modules, processors, memory, and the like that together or alone are configured to perform the operations described herein. For example, an embodiment may comprise a different module for each of the sensor 108 and display 105. Module 104 is electronically coupled or in electronic communication with sensor 108, adjustment buttons 112, menu button 114, video out portal 103 or module, and display 105. Electronic communication between each of the sensor 108, adjustment buttons 112, menu button 114, video out portal 103, and display 105 may comprise any electronic communication previously known in the art.

In the block diagram shown in FIG. 9, module 104 is positioned within the sight housing 102 of the clip-on sight 100 between the sensor 108 and the display 105. Such positioning is provided only as an example and not as limitation. Accordingly, in other embodiments, module 104 or the combination of modules described herein may be placed at various locations within or without the sight housing 102 of the clip-on sight 100.

Display 105 is typically positioned near or proximate a first end 109 of the clip-on sight 100 and may comprise any display suitable for use with a clip-on sight 100. In the embodiment shown in FIGS. 9-10, display 105 comprises a organic light-emitting diode (OLED), LCD, or equivalent display. Although the dimensions and/or resolution of the display may vary in different embodiments, display 105 comprises an OLED 800×600 display.

Lens 115 is typically positioned near or proximate a second end 110 of the clip-on sight 100 opposite the first end 109. Lens 115 may comprise any lens suitable for use with a clip-on sight 100, such as but not limited to an objective 35 mm f/1.4, 60 mm f/1.25, or 124.5 lens.

Sensor 108 is typically positioned within sight housing 102 proximate lens 114, although in various embodiments sensor 108 may be positioned at other locations within the sight housing 102. Sensor 108 may comprise any sensor suitable for use in a night vision, thermal imaging, or image enhancing clip-on sight 100, such as but not limited to a vanadium oxide (VOx) microbolometer sensor. Sensor 108 may further comprise a focal plane array (FPA) 138 of discrete pixels coupled to read-out electronics 148. In an embodiment, the FPA 138 comprises a 320×240 VOx sensor, although other embodiments may comprise differently sized sensors such as 640×480. The image captured by the sensor 108, whether frozen or in real time, is transferred to display 105 through module 104.

Adjustment buttons 112 and menu button 114 are positioned anywhere on an exterior surface of sight housing 102. Alternatively, adjustment buttons 112, menu button 114, and the like may be part of a remote control system as described in U.S. patent application Ser. No. 12/545,777, entitled "Remote Control for a Thermal Imaging Device", the disclosure of which is hereby incorporated by reference, such that they can be at any location desired by a user on or off the weapon (e.g., at another location on the weapon besides the housing 102, on the user, and the like). Although only one menu button 114 is shown in FIGS. 9 and 10, various embodiments may comprise more than one menu button 114. Menu button 114 is in electronic communication with the module 104 and display 105 and allows a user to select along with other functions, one or more of the following functions: reticle select, azimuth adjust, and/or elevation adjust.

In some embodiments, the display 105 activates or turns on responsive to the menu button 114, while in other embodiments a separate power button is utilized. Similarly, display 105 may also be deactivated or turned off responsive to menu button 114. Embodiments of clip-on sight 100 may further comprise a collimator lens 145 positioned between the end 109 and the display 105.

Adjustment buttons 112 may be used to move an alignment reticle 20 (shown in FIG. 7), sometimes a dot, on the display 105. For example, when in elevation adjust mode, Adjustment buttons 112 may move the alignment reticle 20 vertically (up or down) on the display 108. When in an azimuth adjust mode, adjustment buttons 112 may move the alignment reticle 20 horizontally (right or left) on the display 108. In some embodiment, the adjustment buttons 112 are also used to zoom in and zoom out the image displayed on display 105. In other implementations, other buttons or functions may be used to zoom in and zoom out the image displayed on display 105. Adjustment buttons 112 are also utilized to adjust the polarity or the display brightness of the image on the display 105. For example, the polarity of the image display may be changed to show parts of the scene that are warmer than the surrounding areas as either white or black.

Various embodiments of clip-on sight 100 further comprise a power supply module and a lithium battery 103.

As shown in FIG. 10, clip-on sight 100 may be used in a weapon system. Inclusion of the clip-on sight 100 disclosed herein creates a zoom alignment system for use with various weapons. In the system shown in FIG. 10, clip-on sight 100 is mounted to the front rail 165 of weapon 150. A day sight 120 is also mounted to the rear rail 166 of weapon 150. Thus, rails 165 and 166 may comprise a split rail. However, rails 165 and 166 can be integral and can be any rail known in the art, including but not limited to a full rail, Picatinny rail, a Weaver rail, and the like.

Although day sight 120 is shown mounted above the trigger of weapon 150, day sight 150 may be mounted at any location on the weapon that allows a user to look through the day sight 120. Clip-on sight 100 is typically mounted near, sometimes even abutting the day sight 120. Clip-on sight 100 is mounted between the day sight 120 and the bore end 160 of weapon 150. Accordingly, day sight 105 is mounted to weapon 150 between the clip-on sight 100 and the butt end 155 of weapon 150. Capturing end 127 of day sight 120 is typically closest to the clip-on sight 100. Viewing end 125 of day sight 120 is on an end of day sight 120 opposite the capturing end 127. Day sight 120 may comprise any day sight known in the art that allows a user to view the display 105 of clip-on sight 100 through day sight 120, and may also function as a standalone day sight.

In a system comprising a day sight 120 and clip-on sight 100 mounted to a rail 165 on a weapon 150, there are three critical axes that affect boresighting of the weapon: the mechanical axis, the optical axis, and the rail axis. The weapon bore 162 defines the mechanical axis, which is also the initial trajectory of the bullet as it leaves the muzzle.

The optical axis is defined by an objective lens of the day sight 120 and a reticle pattern on the day sight 120. During weapon boresighting, the reticle X, Y positions inside the day sight are adjusted so that the optical sight axis aligns with the weapon bore axis, with a vertical offset for a particular range and the particular bullet ballistics. When this alignment is achieved, and the weapon 150 is fired, the bullet has the best chance of hitting the target.

The rail axis defined by front rail 165 on the weapon 150 may or may not exactly align with the optical axis of the day sight. In generally, when the clip-on sight 100 is installed in front of day sight 120, a small rail axis pointing tolerance will be added to a small manufacturing angular tolerance of the mechanical mount combine to produce a mechanical variation (from weapon to weapon) in mechanical alignment between the clip-on sight 100 and the day sight 120 optical axis.

If the clip-on sight 100 has been correctly designed and fabricated, these mechanical misalignments will not affect the sighting of the combined system when it is used in the un-zoomed (1.0×) viewing mode. This is due to the true un-zoomed (1.0×) Afocal nature of clip-on sight 100. Afocal means . . . [need definition]. The internal alignment of lenses and the lens 115 and display 105 is typically controlled and checked at the time of manufacture for the un-zoomed (1.0×) or zoomed out viewing mode. This basic alignment tolerance for a 1.0× clip-on sight provides alignment within 1 minute of arc (MOA) or 0.3 milliradians (mr). This provides that the boresight error introduced by installing a clip-on sight in front of a bore-sighted day sight is less than 1 inch per 100 yards of target range.

The result of misalignments described above is that when looking through the day sight 120 with the clip-on sight 100 mounted to the weapon 100, the reticle cross hair will overlap the target as the clip-on sight 100 design and fabrication ensure, but will overlap one particular pixel on display 105 within a "circle of uncertainty." The circle of uncertainty is determined by the combined mechanical tolerances of the weapon and mount.

Figure 11:
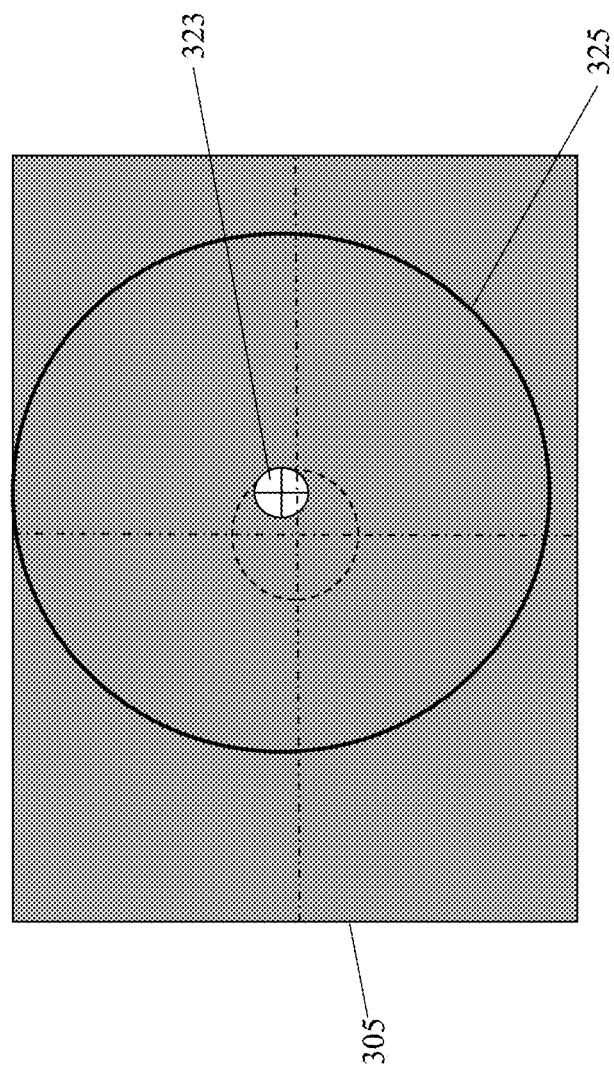
FIG. 11 illustrates an aiming error that occurs with a circular field of view of a typical day sight overlaying a display of a typical clip-on sight.

Thus, previous clip-on sights known in the art that use a digital zoom for image enhancement cause an aiming error between the zoomed in image and the day sight reticle 23. FIG. 11 illustrates the aiming errors that are typical to clip-on sights without an alignment apparatus or method. In FIG. 11, a day sight 120 circular field of view 325 is shown overlaying the display 305 of a clip-on sight. The day sight reticle 323 does not typically overlay the exact center of the display image 305. As a result, an aiming error occurs between the zoomed image and the day sight reticle when the electronic zoom is zoomed in by 2.0 or 4.0 times the original image unless steps are taking for zoom alignment. In fact, manufactures of many conventional clip-on sights often issue a written warning of the inaccuracy or misalignment that occurs when an image is zoomed on the display.

In contrast, various embodiments of the systems, methods, and apparatus disclosed herein provide the necessary correction to the misalignment described above and shown in FIG. 11 that are common to conventional clip-on sights. As described in more detail throughout this document, the apparatus and method disclosed herein allow for an alignment step to "teach" the clip-on sight 100 where the zoom center should be, rather than merely using the center of the display image 105. In various embodiments, the position of the day sight reticle 23 relative to the display is "recorded" and is used as the center for the electronic zoom operation. By recording the position of the day sight reticle 23 relative to the display 105 of the clip-on sight 100, an electronic zoom center point 25 is established. This ensures that the zoomed in image will not shift relative to the day sight reticle 23, thus preserving the aiming accuracy in the zoomed image.

Figure 4:
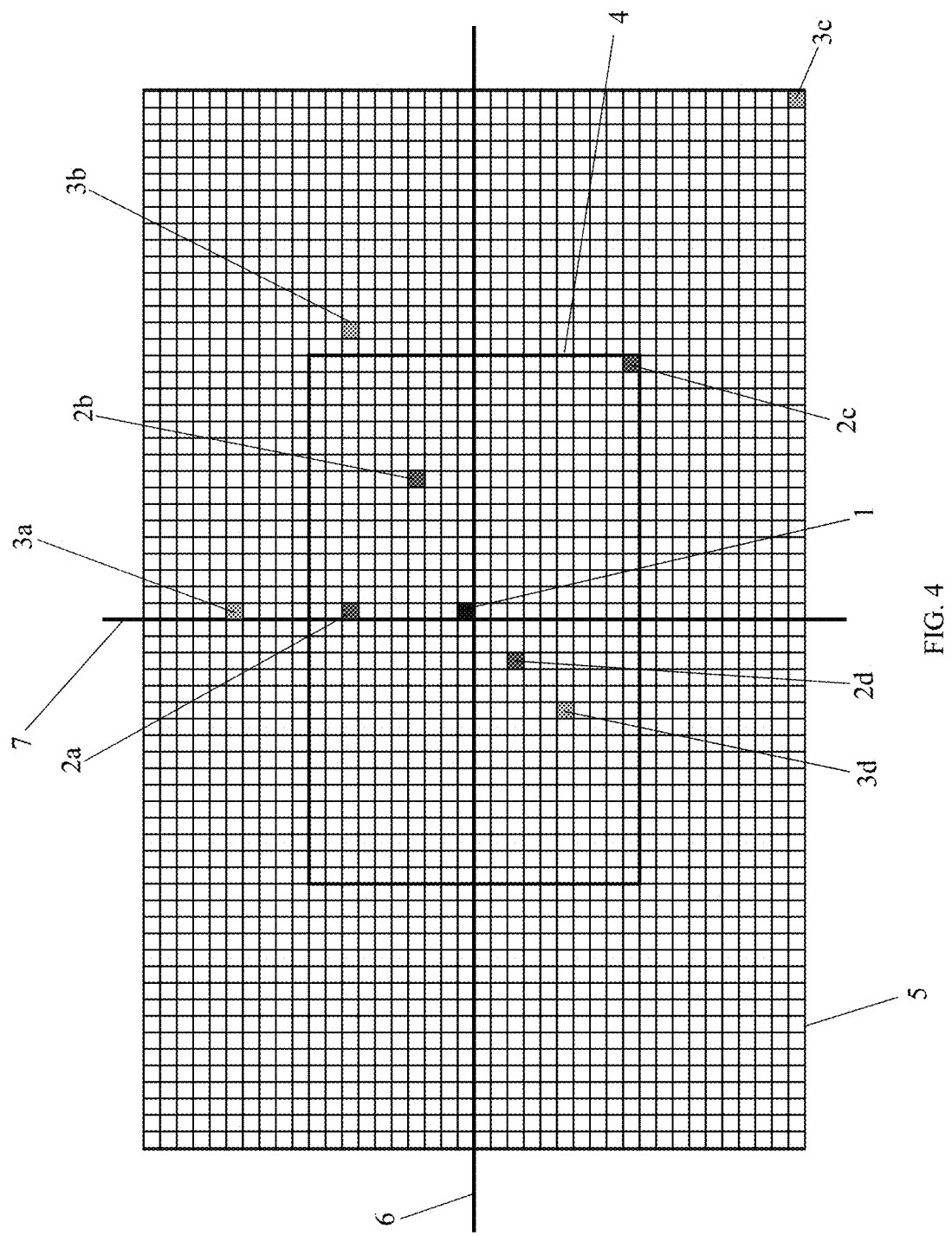
FIG. 4 illustrates the results of a generic 2.0× zoom algorithm.

FIG. 4 illustrates a generic 2.0× zoom algorithm. In a sight with a module utilizing this algorithm, data is taken from every pixel in central box 4, which is approximately 50% of the entire display 5. The image data in this central box 4 is transformed by the generic algorithm such that the image previously only in the central box fills the entire display 5. In system utilizing the generic algorithm, every pixel is displaced by doubling its coordinate position relative to the zoom center. In other words the position of a pixel in the zoomed in mode is 2× the distance from the center pixel in both the horizontal and vertical displacements. This is a result of application of the algorithm (2H, 2V), where H=horizontal position of the pixel and V=the vertical position of the pixel. Thus, the only pixel that is not displaced during the zoom operation is pixel 1 center of the zoom coordinate system. As shown, pixel 2a moves to pixel 3a, pixel 2b moves to pixel 3b, pixel 2c moves to pixel 3c, and pixel 2d moves to pixel 3d during zoom operation. By way of example, pixel 2b is located in the (9, 4) position in the zoomed out mode, and 3b in the (18, 8) position in the zoomed in mode.

Figure 5:
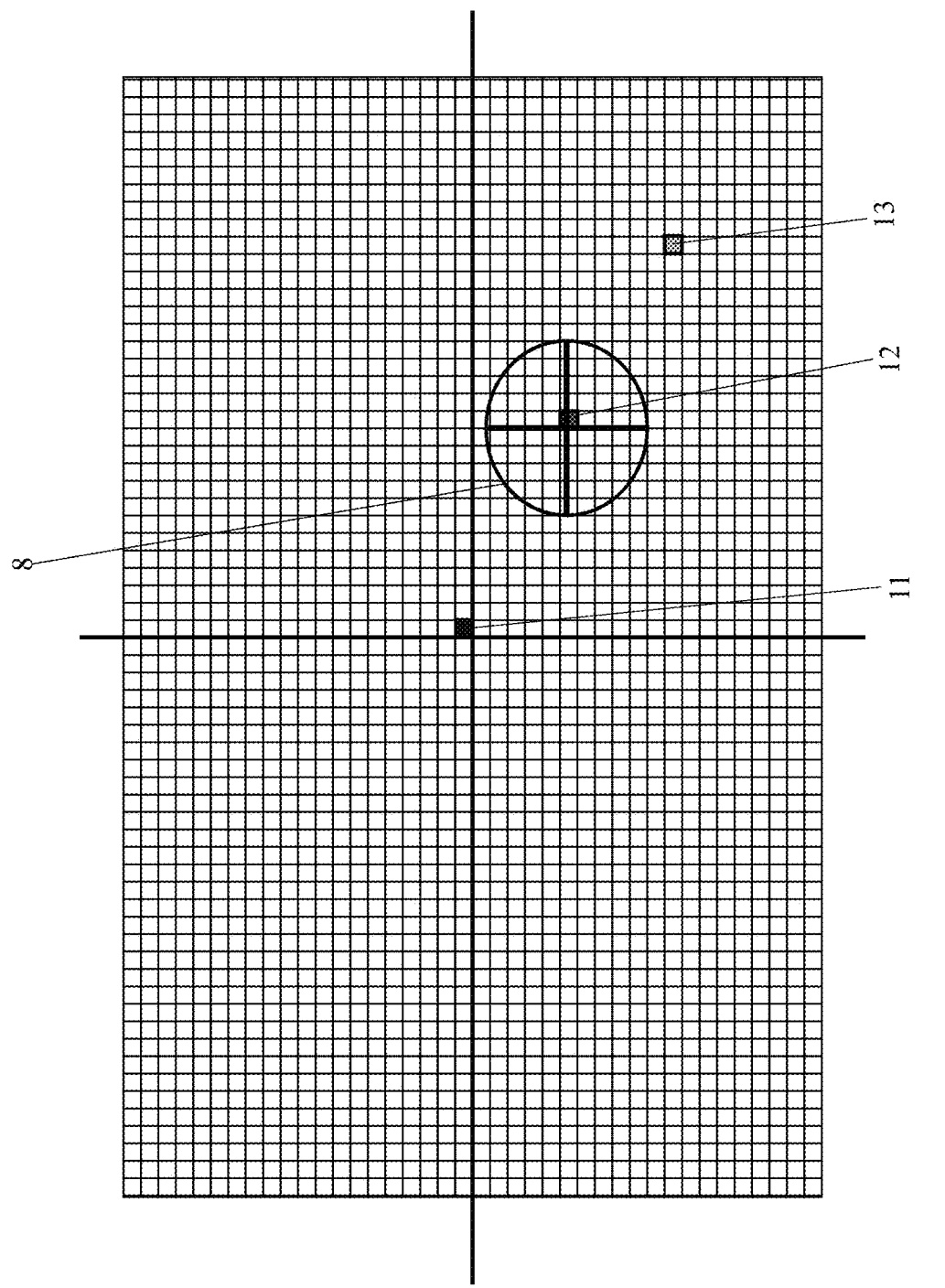
FIG. 5 illustrate aiming errors that occur with a clip-on sight utilizing a generic 2.0× zoom algorithm.

FIG. 5 illustrates aiming errors that occur with a clip-on sight that utilizing a generic zoom algorithm. In this case, the target pixel is pixel 12. When altered to the zoomed in mode, the target pixel moves to pixel 13 rather than remaining in the same position in example reticle 8. Instead, only pixel 11, as the center of the display remains in the same position between the zoomed in and zoomed out modes.

Figure 6:
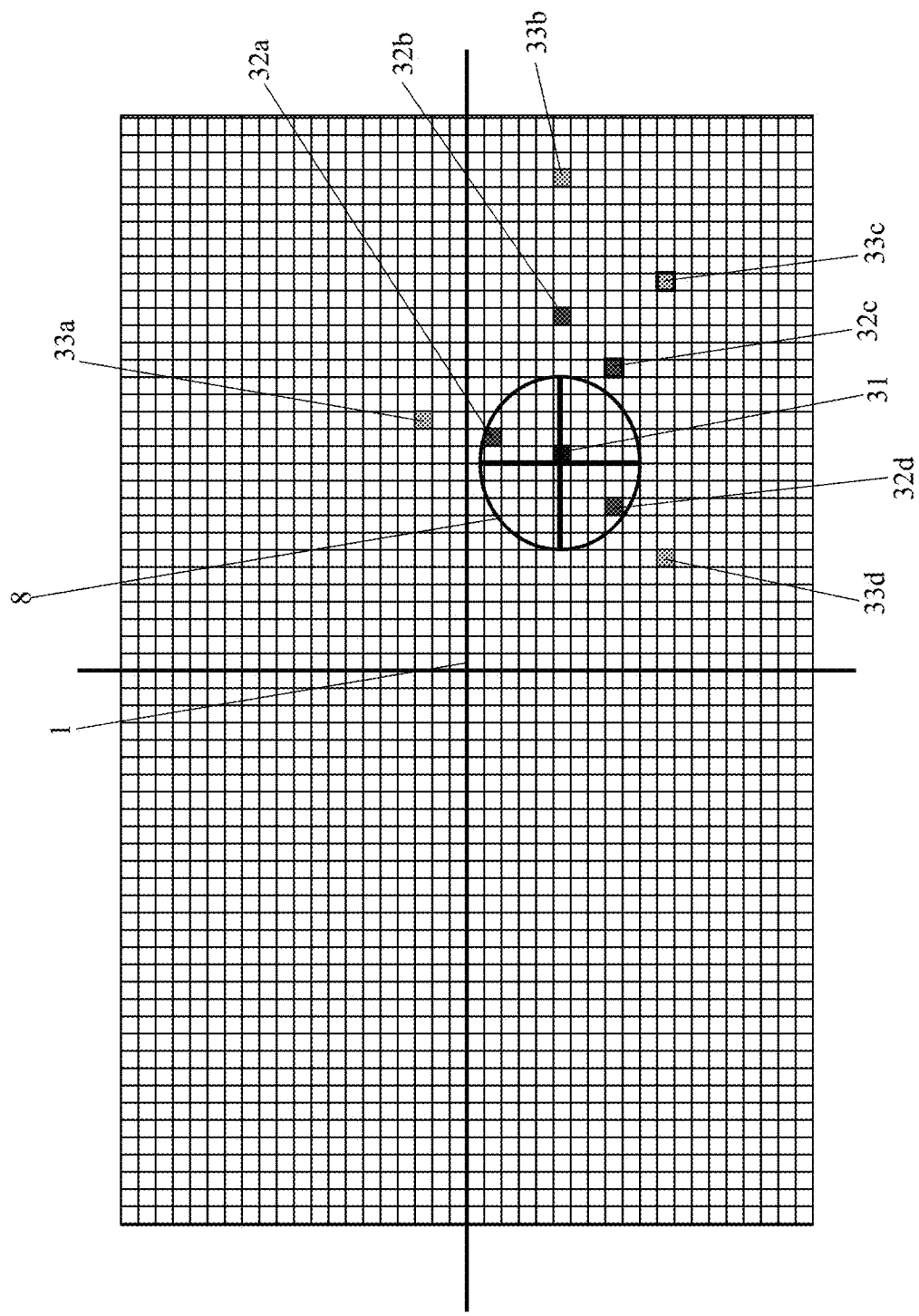
FIG. 6 illustrates an exemplary change in pixel coordinates between an un-zoomed (1.0×) and a 2.0× zoomed clip-on sight utilizing alignment systems and methodology described herein.

FIG. 6 illustrates an exemplary change in pixels coordinates between a zoomed out or un-zoomed (1.0×) mode and a zoomed in 2.0× mode in a clip-on sight 100 utilizing zoom alignment correction. Instead of the pixel 1 at the center of display being the only pixel the remains in the same spot, pixel 31, as selected or set by a user, remains in the same position or coordinates. The zoom alignment operation contemplated herein stores the position of the day sight reticle 8 relative to the electronic display. The horizontal and vertical coordinates are subtracted from the coordinates of every pixel before making transforming the image from the zoomed out or un-zoomed (1.0×) mode to the zoomed in 2.0× mode.

For example, pixel 32c is located at position (18, −9) in the zoomed out mode, but moves to pixel 33c located at position (23, −12) in the zoomed in mode. This is because the zoom alignment methods and systems disclosed herein have determined the electronic zoom center point 31 to be located at position (13, −6). This is a result of application of the algorithm (2H-Rh, 2V-Rv), where H=horizontal position of the pixel, Rh is the horizontal position of the reference or electronic zoom center point, V=the vertical position of the pixel, and Rv is the vertical position of the reference or electronic zoom center point.

Figure 1B:
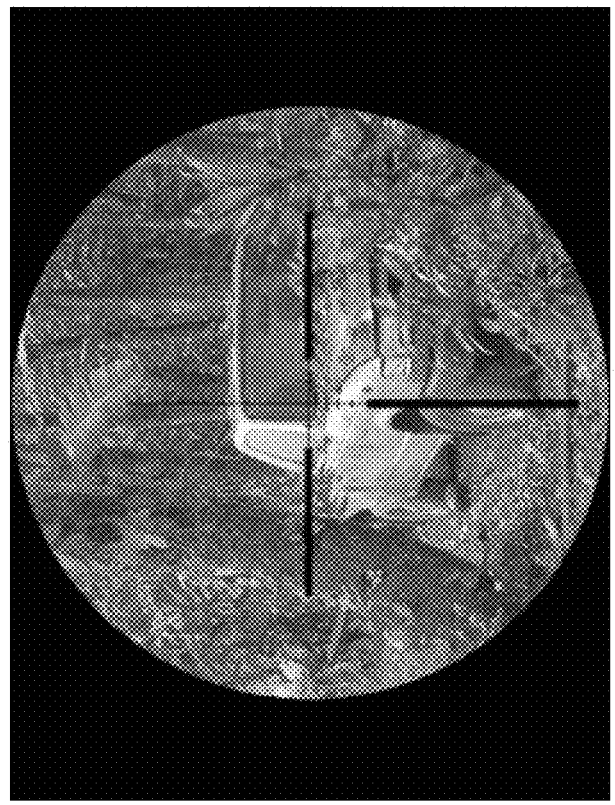
FIG. 1B is an exemplary view of the target of FIG. 1A through a day sight and an un-zoomed (1.0×) clip-on sight.
Figure 1A:
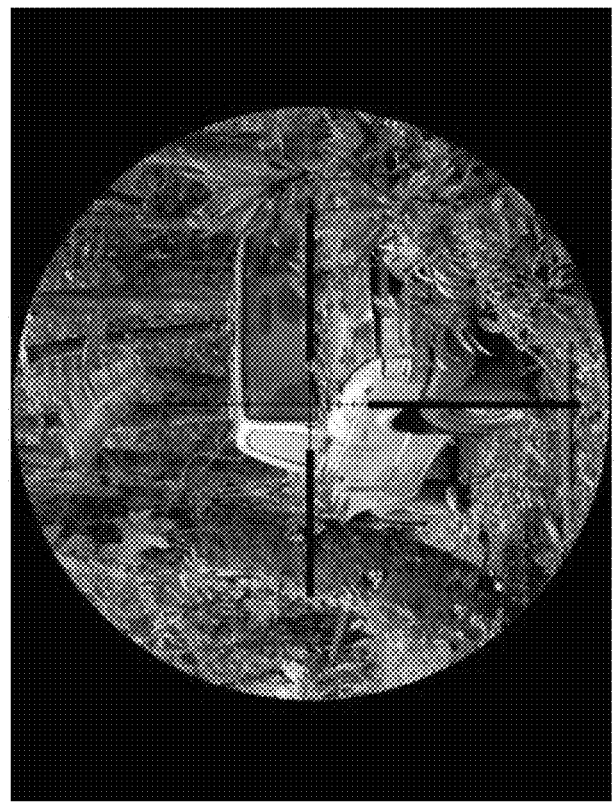
FIG. 1A is an exemplary view of a target through a day sight on a weapon.
Figure 2B:
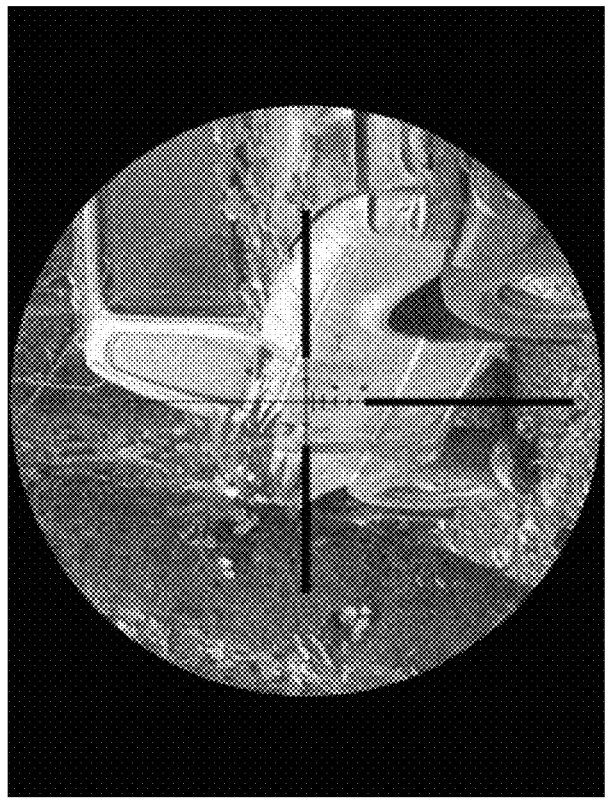
FIG. 2B is an exemplary view of the target of FIG. 1A through a day sight and an unaligned 2.0× zoomed clip-on sight.
Figure 2A:
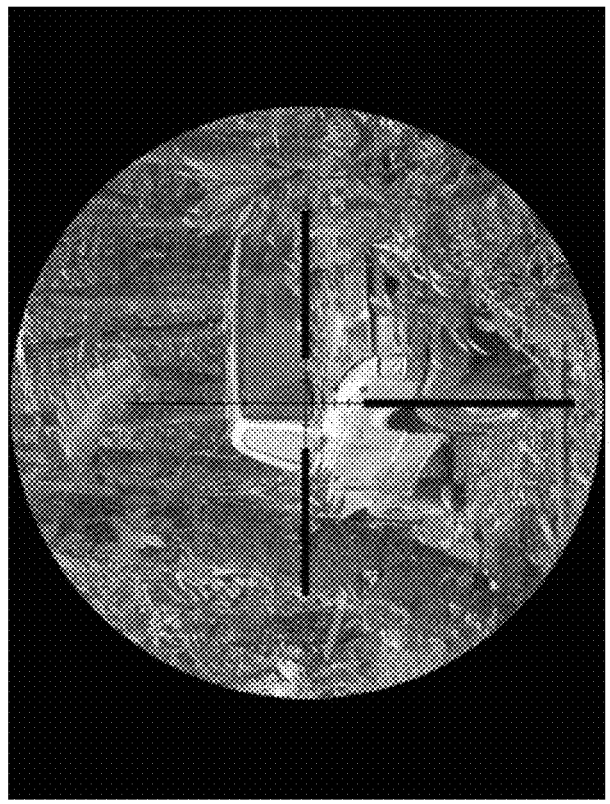
FIG. 2A is an exemplary view of the target of FIG. 1A through a day sight and an un-zoomed (1.0×) clip-on sight.
Figure 3B:
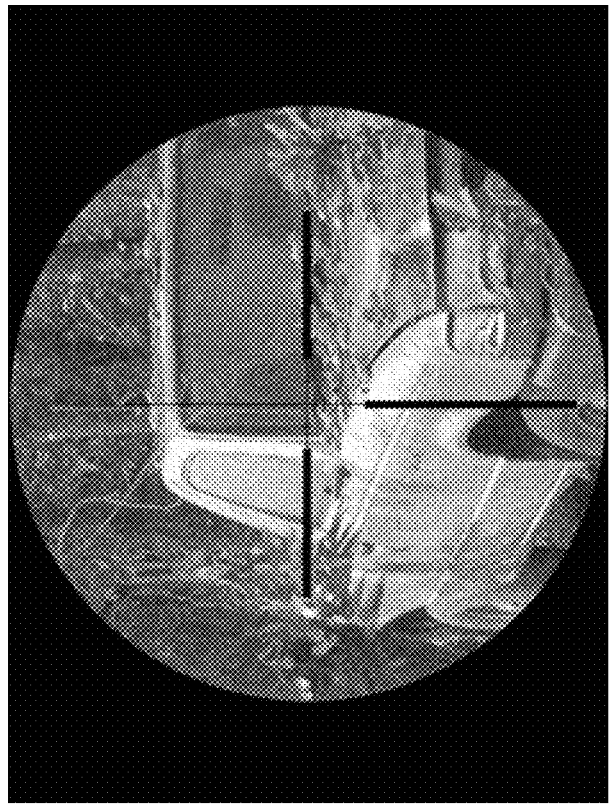
FIG. 3B is an exemplary view of the target of FIG. 1A through a day sight and an aligned or calibrated 2.0× zoomed clip-on sight.
Figure 3A:
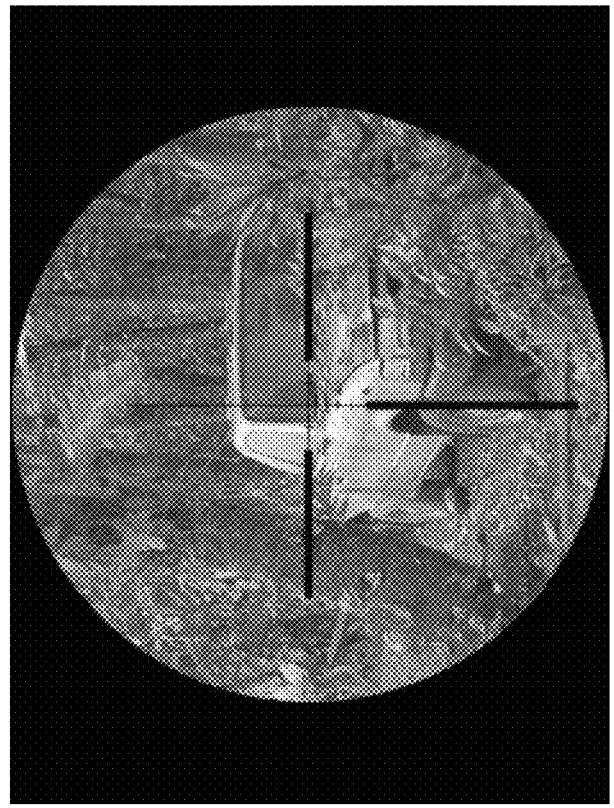
FIG. 3A is an exemplary view of the target of FIG. 1A through a day sight and an un-zoomed (1.0×) clip-on sight.

The result of applying the zoom alignment correction method is that the zoomed image remains centered around the day sight reticle pattern, shown as pixel 31 in FIG. 6. This means the point of aim is not affected—whether the sight is used in the un-zoomed (1.0×) mode or the 2.0× zoomed in mode. An example illustration using the correction method is shown in FIGS. 3A and 3B. FIG. 3A illustrates an image viewed through day sight 120 with clip-on sight 100 in an un-zoomed (1.0×) mode, while FIG. 3B illustrates the image in a 2.0× zoomed in mode. In both the un-zoomed and zoomed in modes, the reticle is centered on the bottom left of the windshield in the image (in contrast to FIGS. 2A and 2B, which do not utilize a zoom alignment correction apparatus, system, or method).

Figure 7A:
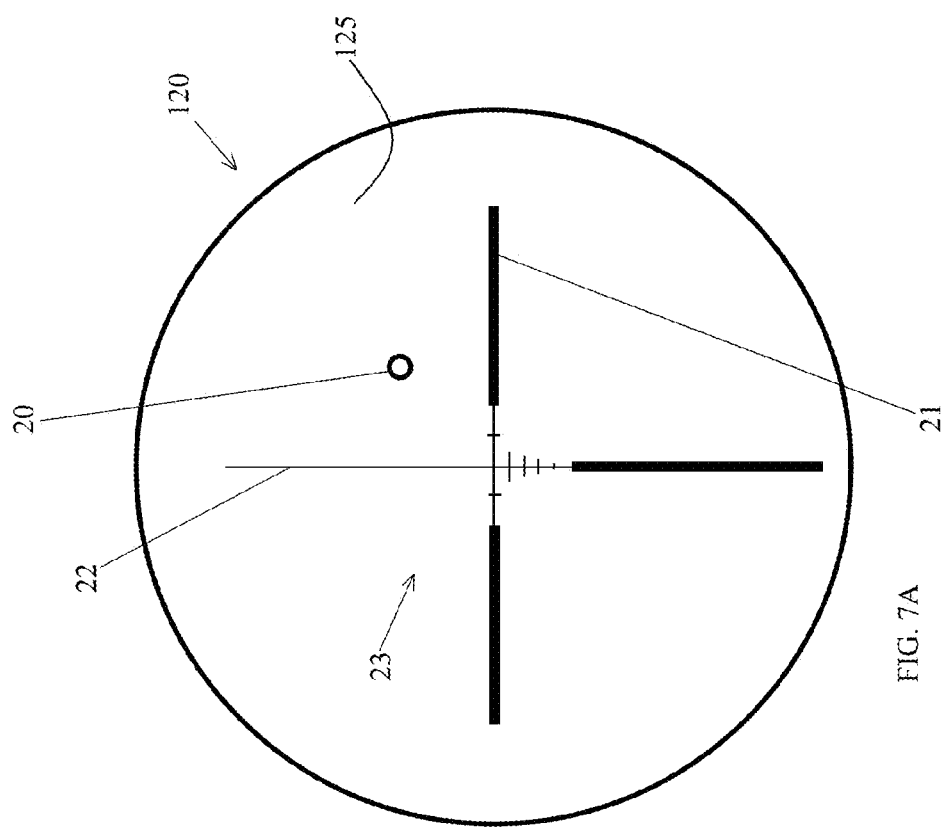
FIG. 7A is an exemplary view through a day sight of a first step in alignment of a clip-on sight.
Figure 7C:
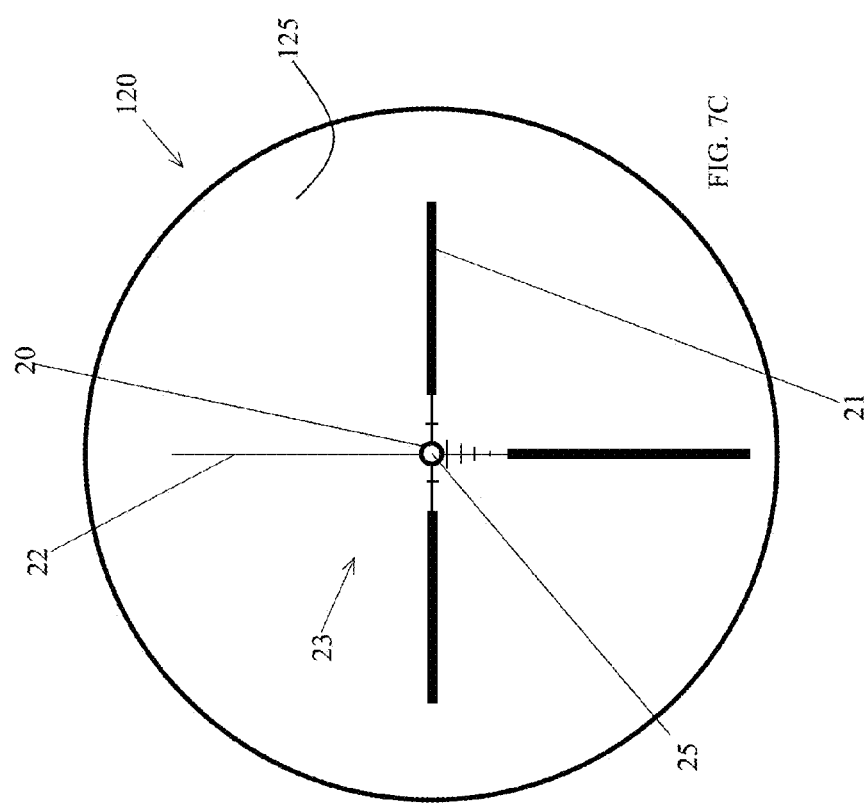
FIG. 7C is an exemplary view through a day sight of a third step in alignment of a clip-on sight.

FIGS. 7A-7C provide an example of how the clip-on sight 100 of FIGS. 9-10 utilizes the zoom alignment method in a system. FIGS. 7A-7C are exemplary views a user may see through viewing end 125 of day sight 120 when the clip-on sight 100 is aligned to allow for zoom adjustment. As shown in FIG. 7A, responsive to the menu button 114, an alignment reticle 20 is displayed on display 105 and visible through day sight 120. In FIGS. 7A-7C, alignment reticle 20 comprises a dot. An embodiment of a clip-on sight 100 may allow the user to choose from any type of alignment reticles (e.g., a dot, a cross-hair, and the like).

In the example shown in FIG. 7A, alignment reticle 20 is not aligned with the center of reticle 23 of day sight 20. To adjust the alignment reticle 20 and set or store a location of the electronic zoom center point in memory, the alignment reticle is moved responsive to the adjustment buttons 112. For example, responsive to the menu button 114, clip-on sight 100 may enter an elevation adjustment mode. In the elevation adjustment mode, adjustment buttons 112 move the alignment reticle 20 vertically (up and down) on the display 105 until the alignment reticle 20 overlaps the day sight reticle 23 in elevation or vertical alignment axis 21 (shown in FIG. 7B).

Similarly, responsive to the menu button 114, clip-on sight 100 may enter an azimuth adjustment mode. In the azimuth adjustment mode, adjustment buttons 112 move the alignment reticle 20 horizontally (right and left) on the display (105) until the alignment reticle 20 overlaps the day sight reticle 23 in azimuth or horizontal alignment axis 22 (shown in FIG. 7C). Although in FIGS. 7A-7C the vertical adjustment to alignment reticle 20 is made before the horizontal adjustment, the horizontal adjustment may be performed prior to the vertical adjustment. Alternatively, the alignment could be a single step (i.e., done simultaneously) with different control devices (e.g., joy stick or the like).

Once alignment reticle 20 is aligned with both the horizontal alignment axis 22 and vertical alignment axis 21 of day sight retical 23, the location of the electronic zoom center point 25 may be stored in memory of module 104. Storing in the memory may comprise pressing any or all of the adjustment buttons, menu buttons, or other buttons in a specified manner (such as pattern or duration). Alternatively, the location of the electric zoom center point 25 may be stored in memory as the last location of alignment reticle 20 before the menu or mode was exited. With the electronic zoom center point 25 centered on the reticle 23 of day sight 120, the reticle 23 will provide accurate aim whether the clip-on sight is in an un-zoomed (1.0×) mode or 2.0× zoomed in mode.

Figure 8:
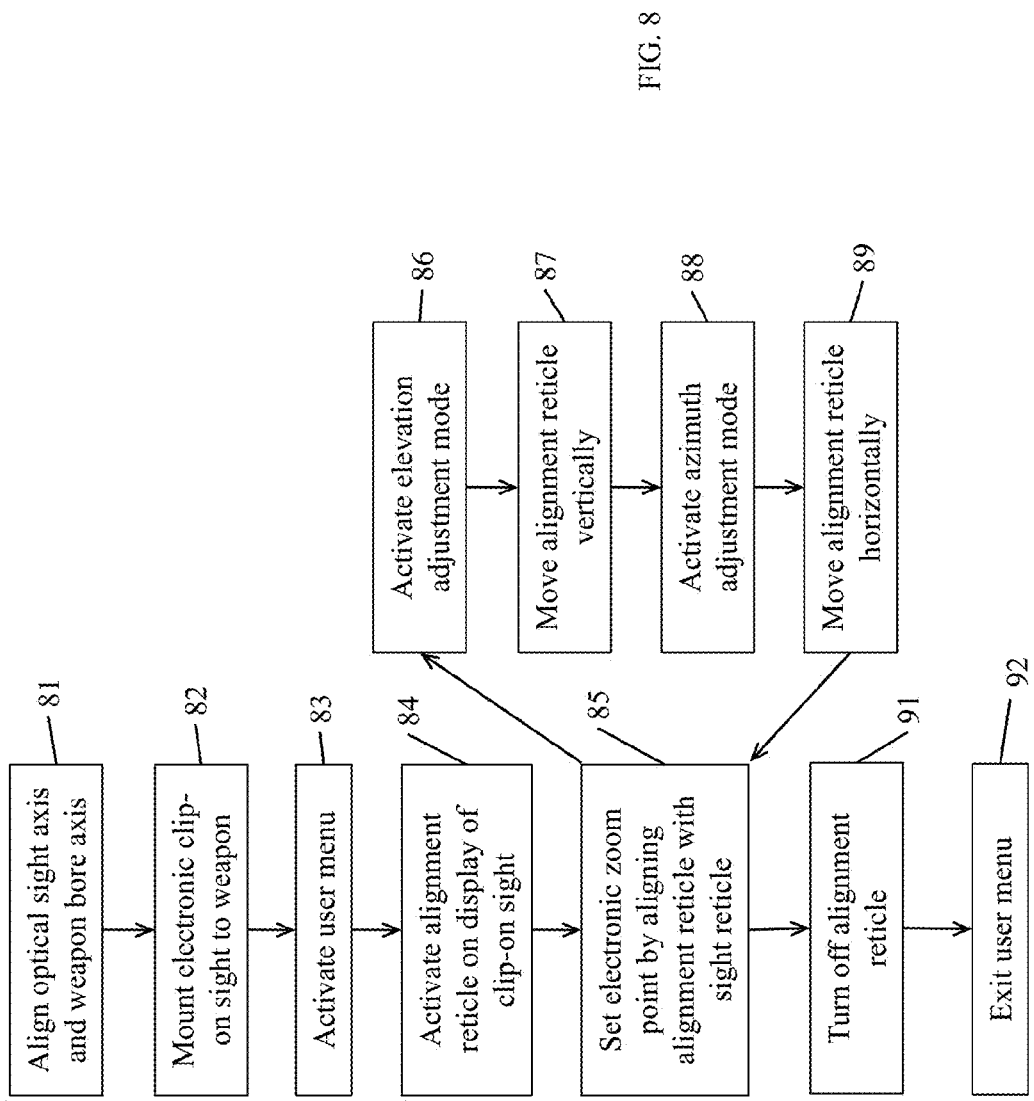
FIG. 8 is a flowchart of an exemplary method for aligning a clip-on sight.

FIG. 8 provides an exemplary flow chart of a method of zoom alignment of a electronic clip-on sight such as sight 100. Although various steps are described herein, not every step is required in every embodiment of the method, nor is the order of steps illustrated in FIG. 8 the only or required order for performing the steps of the method of zoom alignment of clip-on sight 100 (e.g., steps 86-89 could be reversed or be carried out simultaneously). An embodiment of the method includes aligning an optical sight axis of a day sight 120 with a weapon bore axis of a weapon 150 (step 81) in any suitable manner known in the art. An embodiment of the method comprises mounting clip-on sight 100 to a rail 165 of weapon 150 (step 82).

An embodiment of the method further comprises activating a user menu on the clip-on sight 100 by pressing the menu button 114 (step 83). In other embodiments, the user menu may be activated by other buttons or actions on clip-on sight 100. An embodiment of the method further comprises activating an alignment reticle 20 on display 105 of clip-on sight 100 (step 84). The alignment reticle may be activated responsive to menu button 114, or any other buttons on clip-on sight 100.

An embodiment of a method further comprises setting or otherwise storing a location of the electronic zoom center point 25 by aligning alignment reticle 20 with day sight reticle 23. Aligning alignment reticle 20 with day sight reticle 23 may comprise activating, with the menu button 114, an elevation adjustment mode (step 86), then moving alignment reticle 20 vertically (step 87). Aligning alignment reticle 20 with day sight reticle 23 may also comprise comprise activating, with the menu button 114, an azimuth adjust mode (step 88), then moving alignment reticle 20 horizontally (step 89). An embodiment of a method further comprises turning off, with menu button 114, alignment reticle 20 (step 91). Finally, an embodiment of a method further comprises exiting the user menu (step 92).

As a result of performing the alignment method, anytime the zoom function is operated, the location of the current zoom center point 25 stored in memory is used to calculate the required zoomed image displacements. Calculation may be accomplished using the algorithm or methods disclosed herein, above.

Embodiments of the systems, method, and apparatus disclose herein are advantageous over previous clip-on sights because the improved systems, methods, and apparatuses allow a use to aim a weapon with magnified imaging without introducing aiming errors. Importantly, the systems, methods, and apparatus disclosed herein do not need to involve live firing to establish the true aim, and may alternatively be performed in any setting where a weapon, with a bore sighted day sight installed, is available.

It will be understood that implementations are not limited to the specific components disclosed herein, as virtually any components consistent with the intended operation of a method and/or system implementation for zoom of alignment of an electronic clip-on sight may be utilized. Accordingly, for example, although particular sight housings, displays, lens, and sensors may be disclosed, such components may comprise any shape, size, style, type, model, version, class, grade, measurement, concentration, material, weight, quantity, and/or the like consistent with the intended operation of a method and/or system implementation for a zoom of alignment of an electronic clip-on may be used.

In places where the description above refers to particular implementations of zoom of alignment of an electronic clip-on, it should be readily apparent that a number of modifications may be made without departing from the spirit thereof and that these implementations may be applied to other zoom of alignment of an electronic clip-on. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A clip-on sight, comprising:
   a sight housing;
   a lens positioned proximate a first end of the housing;
   a sensor positioned proximate the lens;
   a display positioned proximate a second end of the housing opposite the first end of the housing;
   at least one menu button;
   two adjustment buttons;
   a mounting unit;
   at least one module positioned within the housing, the at least one module configured to:
      display an alignment reticle on the display responsive to the at least one menu button;
      move the alignment reticle on the display to an electronic zoom center point responsive to the two adjustment buttons;
      store the electronic zoom center point in memory;
      transmit an un-zoomed image from the sensor to the display; and
      transmit a zoomed-in image from the sensor to the display, the zoomed-in image centered on the electronic zoom center point.

2. The clip-on sight of claim 1, wherein the at least one module is configured to move the alignment reticle vertically on the display responsive to the two adjustment buttons when the at least one module is in an elevation adjustment mode, and move the alignment reticle horizontally on the display responsive to the two adjustment buttons when the at least one module is an azimuth adjustment mode.

3. The clip-on sight of claim 1, wherein the alignment reticle comprises one of a dot and a cross-hair.

4. A clip-on sight, comprising:
   a sight housing;
   a lens positioned proximate a first end of the housing;
   a microbolometer positioned proximate the lens;
   a display positioned proximate a second end of the housing opposite the first end of the housing;
   at least one menu button;
   at least one adjustment button;
   a mounting unit;
   at least one module positioned within the housing, the at least one module configured to:
      display an alignment reticle on the display responsive to the at least one menu button;
      move the alignment reticle on the display to an electronic zoom center point responsive to the at least one adjustment button;
      store the electronic zoom center point in memory;
      transmit an un-zoomed image from the sensor to the display; and
      transmit a zoomed-in image from the sensor to the display, the zoomed-in image centered on the electronic zoom center point.

5. The clip-on sight of claim 1, wherein the two adjustment buttons and the at least one menu button are one of positioned on the sight housing and positioned on a remote control system.

* * * * *